(12) United States Patent
An

(10) Patent No.: US 11,850,930 B2
(45) Date of Patent: Dec. 26, 2023

(54) BATTERY-EQUIPPED VEHICLE BODY AND DOOR CLOSURE SYSTEMS

(71) Applicants: HYUNDAI MOTOR COMPANY, Seoul (KR); KIA Motors Corporation, Seoul (KR)

(72) Inventor: Kwang Hee An, Bucheon-si (KR)

(73) Assignees: HYUNDAI MOTOR COMPANY, Seoul (KR); Kia Motors Corporation, Seoul (KR)

( * ) Notice: Subject to any disclaimer, the term of this patent is extended or adjusted under 35 U.S.C. 154(b) by 307 days.

(21) Appl. No.: 17/144,871

(22) Filed: Jan. 8, 2021

(65) Prior Publication Data

US 2022/0032757 A1    Feb. 3, 2022

(30) Foreign Application Priority Data

Aug. 3, 2020 (KR) .................. 10-2020-0097027

(51) Int. Cl.
| | |
|---|---|
| *B60K 1/04* | (2019.01) |
| *B62D 27/02* | (2006.01) |
| *B60J 5/06* | (2006.01) |
| *B62D 25/20* | (2006.01) |
| *B60J 5/04* | (2006.01) |

(Continued)

(52) U.S. Cl.
CPC ............ *B60K 1/04* (2013.01); *B60J 5/0473* (2013.01); *B60J 5/06* (2013.01); *B60L 50/66* (2019.02); *B62D 25/2036* (2013.01); *B62D 27/02* (2013.01); *E05D 15/066* (2013.01); *E05F 15/60* (2015.01); *B60K 2001/0438* (2013.01); *E05Y 2201/434* (2013.01); *E05Y 2201/684* (2013.01);

(Continued)

(58) Field of Classification Search
CPC .. B60K 1/04; B60K 2001/0438; B60J 2/0473; B60J 5/06; B60L 50/66; B62D 25/2036; B62D 27/02; E05D 15/066; E05F 15/60; E05Y 2201/454; E05Y 2201/684; E05Y 2400/612; E05Y 2600/45; E05Y 2900/531
See application file for complete search history.

(56) References Cited

U.S. PATENT DOCUMENTS

| | | |
|---|---|---|
| RE44,994 E | 7/2014 | Rawlinson et al. |
| 8,960,781 B2 | 2/2015 | Rawlinson et al. |

(Continued)

FOREIGN PATENT DOCUMENTS

| | | |
|---|---|---|
| JP | 4384206 | 12/2009 |
| JP | 5668680 | 2/2015 |

(Continued)

*Primary Examiner* — Jason D Shanske
*Assistant Examiner* — James J Triggs
(74) *Attorney, Agent, or Firm* — Lempia Summerfield Katz LLC

(57) ABSTRACT

Disclosed is a battery-equipped vehicle body including: a lower panel of a vehicle extending in a planar direction, and having a battery coupled to the upper portion or lower portion thereof; a door opening/closing device located on the side surface of the lower panel, and coupled so that a door of the vehicle is opened and closed; and a cross member extending in a direction parallel to the transverse direction of the vehicle, coupled to the upper portion or lower portion of the lower panel, and located to correspond to the door opening/closing device in the transverse direction.

9 Claims, 9 Drawing Sheets

(51) Int. Cl.
*B60L 50/60* (2019.01)
*E05D 15/06* (2006.01)
*E05F 15/60* (2015.01)

(52) U.S. Cl.
CPC ..... *E05Y 2400/612* (2013.01); *E05Y 2600/45* (2013.01); *E05Y 2900/531* (2013.01)

(56) References Cited

U.S. PATENT DOCUMENTS

| | | |
|---|---|---|
| 10,023,038 B2 | 7/2018 | Rawlinson et al. |
| 10,597,084 B2 | 3/2020 | Ayukawa |
| 11,370,287 B2 * | 6/2022 | Tsuyuzaki ............ B62D 21/157 |
| 11,380,287 B2 * | 7/2022 | Kunitomo ................ G09G 5/37 |
| 2018/0334022 A1 | 11/2018 | Rawlinson et al. |
| 2019/0382051 A1 * | 12/2019 | Toyota ..................... B60R 9/04 |

FOREIGN PATENT DOCUMENTS

| | | |
|---|---|---|
| JP | 6546968 B2 | 7/2019 |
| JP | 6580094 | 9/2019 |

* cited by examiner

BATTERY-EQUIPPED VEHICLE BODY AND DOOR CLOSURE SYSTEMS

CROSS REFERENCE TO RELATED APPLICATION

The present application claims priority to and the benefit of Korean Patent Application No. 10-2020-0097027, filed on Aug. 3, 2020, the entire contents of which are incorporated herein by reference.

FIELD

The present disclosure relates to a battery-equipped vehicle body designed to protect a battery mounted in a vehicle from external shock.

BACKGROUND

The statements in this section merely provide background information related to the present disclosure and may not constitute prior art.

Generally, a front side member formed to extend in the front-rear direction of a vehicle is disposed on both sides of a vehicle body for the vehicle in the width direction under an engine room of a front vehicle body of the vehicle, thereby strengthening a structural rigidity of the front vehicle body.

A side sill, which extends in the longitudinal direction of the vehicle and is disposed on both sides of the vehicle body for the vehicle in the width direction, is connected to the rear of the front side member to protect the side surface of the vehicle.

Meanwhile, a floor panel forming the bottom surface of the vehicle body is composed of a front floor panel, a center floor panel, and a rear floor panel in the front-rear direction from the front of the vehicle. Here, the front floor panel configures the bottom surface of the engine room, the center floor panel configures the bottom surface of a passenger compartment, and the rear floor panel configures the bottom surface of a luggage compartment.

Among them, the upper surface of the center floor panel may be mounted with an accelerator pedal, a brake pedal, a seat for a passenger, and the like, and the lower surface thereof may be mounted with an exhaust pipe, a propeller shaft, and the like. Further, the side sill is coupled to the center floor panel on both sides of the vehicle body in the width direction to function to response to the side collision of the vehicle.

Meanwhile, an electric vehicle or a hybrid electric vehicle moved by power is provided with a battery case therein in order to mount a high capacity battery on the lower surface of the center floor panel or the rear floor panel.

However, a structure for mounting the battery case in which the high capacity battery is embedded is complicated, and if a portion in which the transfer of the load through these structures is cut off is increased, the response performance against the collision, particularly, the side collision of the vehicle may be degraded.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a cross member located under a vehicle body to correspond to a door opening/closing device to support the shock applied to the door opening/closing device from the side surface upon external side collision by the cross member, thereby inhibiting or preventing the battery from being damaged by the indentation of the door opening/closing device into the battery side.

In one form of the present disclosure, a battery-equipped vehicle body includes: a lower panel of a vehicle extending in a planar direction, where a battery is coupled to an upper portion or a lower portion of the lower panel; a door opening/closing device located on a side surface of the lower panel, and coupled to a door of a vehicle so that the door of a vehicle is opened and closed; and a cross member extending in a transverse direction of the vehicle, coupled to the upper portion or lower portion of the lower panel, and located to correspond to the door opening/closing device in the transverse direction.

The battery-equipped vehicle body further includes: a side sill extending in a longitudinal direction of the vehicle, and coupled to both sides of the lower panel or the cross member, in which the door opening/closing device is mounted on the outside of the side sill.

The side sill is coupled to surround the upper portion or lower portion of the door opening/closing device.

The battery-equipped vehicle body further includes: a battery bracket extending outward from a battery in the transverse direction so as to be coupled to the side sill in a state where the battery and the side sill are spaced apart from each other in the transverse direction.

The door opening/closing device and the battery are located so that parts thereof overlap with each other in a vertical direction of the vehicle.

The battery bracket and the side sill are penetrated from a bottom to a top and coupled by a mounting bolt.

The cross member is penetrated in a vertical direction of the vehicle together with the lower panel and a high voltage battery and the lower panel and the high voltage battery are coupled by a mounting module.

The door opening/closing device is provided with a sliding rail and the door of the vehicle is slid and opened and closed in the longitudinal direction of the vehicle.

The door opening/closing device is provided with a swing hinge and the door of the vehicle is swung and opened and closed in the front or rear direction of the vehicle.

In another form, a battery-equipped vehicle body may include: a lower panel extending in a planar direction, wherein a battery is coupled to an upper portion or a lower portion of the lower panel; a plurality of door opening/closing devices located on a side surface of the lower panel, and coupled to corresponding doors of a vehicle so that the doors of the vehicle is opened and closed; and a cross member extending in a transverse direction of the vehicle, coupled to the upper portion or lower portion of the lower panel, and located to correspond to the plurality of door opening/closing devices in the transverse direction. In particular, the doors are arranged to be opposite to each other and configured to slid to be opened and closed in a front-rear direction of the vehicle.

The battery-equipped vehicle body according to the present disclosure may locate the cross member at the corresponding location in the transverse direction of the vehicle on the door opening/closing device, thereby inhibiting or preventing the battery from being damaged by the indentation of the door opening/closing device into the vehicle upon side collision of the vehicle, by the cross member.

Further, the door opening/closing device is mounted outside the side sill, such that the side sill may support the door opening/closing device to be indented into the vehicle upon side collision of the vehicle.

Further, the side sill may surround the top and bottom of the door opening/closing device and be coupled to the door opening/closing device, thereby protecting the door opening/closing device.

Further, the battery bracket for coupling the battery to the side sill may be provided, and the battery bracket may be formed so that the side sill and the battery are spaced apart from each other, thereby protecting the battery from the external collision.

Further, the battery bracket and the side sill may be coupled to be penetrated from the bottom to the top by the mounting bolt such that the door opening/closing device may rotate around the mounting bolt upon side collision of the vehicle, thereby reducing a shock force applied to the battery.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 8:
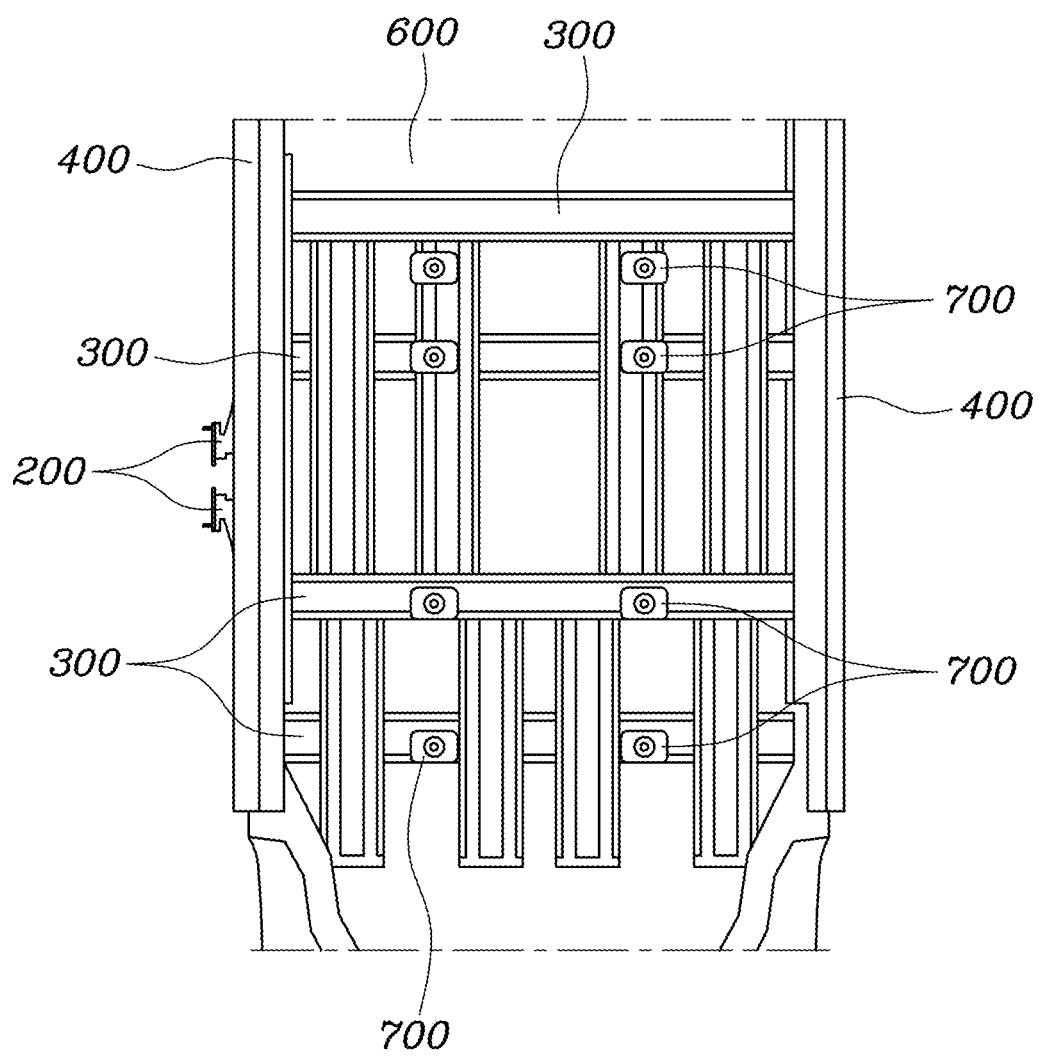
Figure 9:
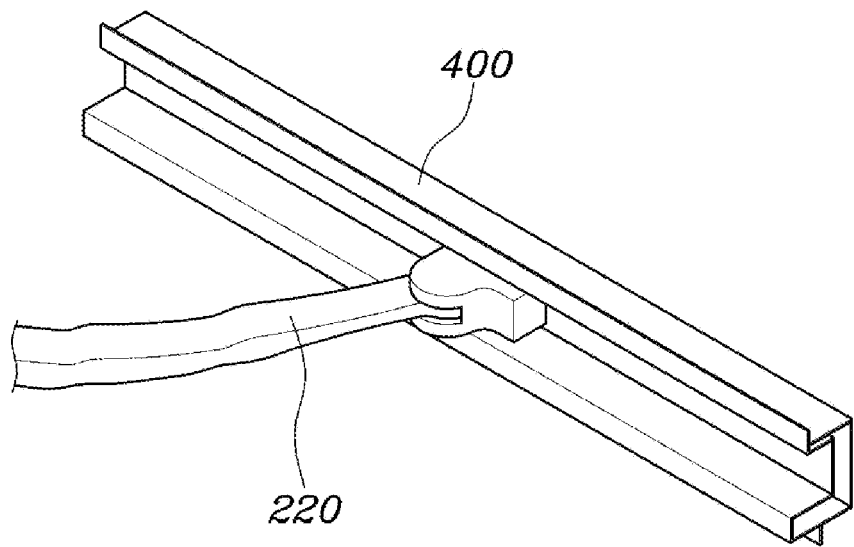
Figure 10:
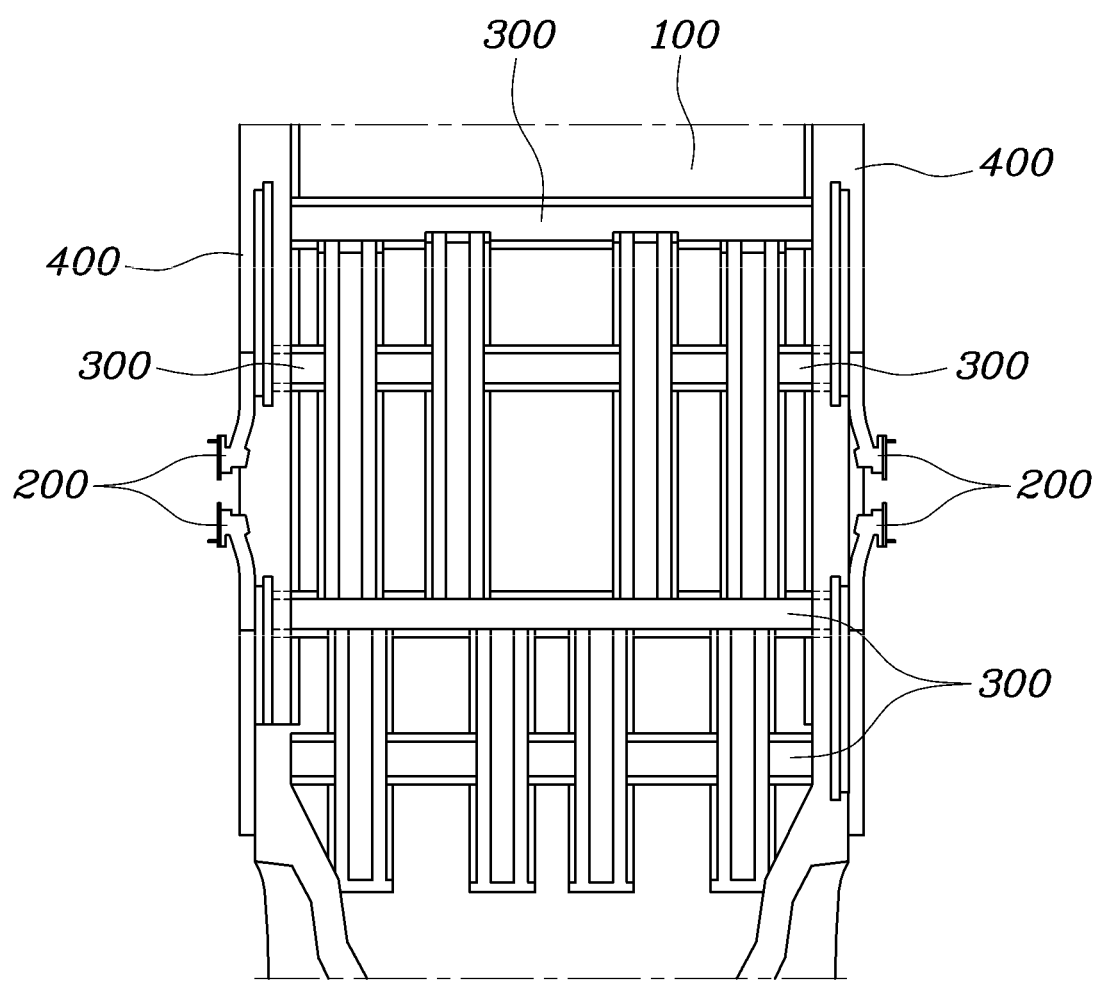

FIG. 8 is a bottom diagram illustrating the battery-equipped vehicle body according to the exemplary form of the present disclosure; and FIG. 9 is a perspective diagram illustrating a second exemplary form of the door opening/closing device in the battery-equipped vehicle body according to the exemplary form of the present disclosure; and FIG. 10 is a plan diagram illustrating a plurality of door opening/closing devices in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural to functional descriptions of the forms of the present disclosure disclosed in the present specification or application are only illustrated for the purpose of describing the forms according to the present disclosure, and the forms according to the present disclosure may be embodied in various forms and should not be construed as being limited to the forms described in the present specification or application.

Since the forms according to the present disclosure may be variously changed and have various forms, specific forms will be illustrated in the drawings and described in detail in the present specification or application. However, this is not intended to limit the forms according to the concept of the present disclosure to a particular disclosed form, and should be understood to include all changes, equivalents, and substitutes included in the spirit and scope of the present disclosure.

Terms such as first and/or second may be used to describe various components, but the components should not be limited by the terms. The tams are used only for the purpose of distinguishing one component from another, for example, without departing from the scope according to the concept of the present disclosure, the first component may be named a second component, and similarly, the second component may also be named the first component.

When a component is referred to as being "connected" or "coupled" to another component, it may be directly connected or coupled to another component, but it may be understood that other components may be present therebetween. On the other hand, when a component is referred to as being "directly connected" or "directly coupled" to another component, it may be understood that there are no other components therebetween. Other expressions describing the relationship between components, that is, "between" and "just between" or "adjacent to" and "directly adjacent to" or the like should be interpreted as well.

The terminology used in the present specification is merely for the purpose of describing particular exemplary forms, and is not intended to limit the present disclosure. The singular expression may include plural expression, unless the phrases clearly indicate the opposite. In the present specification, it should be understood that the term "comprising", "having", or the like specifies the presence of the characteristic, integer, step, operation, component, part, or a combination thereof embodied, and does not exclude the presence or addition possibility of one or more other characteristics, integers, steps, operations, components, parts or combinations thereof in advance.

Unless defined otherwise, all terms including technical terms and scientific terms used herein have the same meaning as commonly understood by those skilled in the art to which the present disclosure pertains. Terms like those defined in the dictionary commonly used should be interpreted to have a meaning consistent with the meaning in the context of the related technology, and are not interpreted in an ideal or very formal sense, unless clearly defined in the present specification.

Hereinafter, by describing exemplary forms of the present disclosure with reference to the accompanying drawings, the present disclosure will be described in detail. The same reference numerals indicated in each drawing represent the same members.

A control unit according to an exemplary form of the present disclosure may be implemented by a non-volatile memory (not illustrated) configured to store an algorithm configured to control operations of various components of a vehicle or data relating to software commands for reproducing the algorithm and a processor (not illustrated) configured to perform an operation described below using the data stored in the corresponding memory. Here, the memory and the processor may be implemented by a separate chip. Alternatively, the memory and the processor may be implemented by an integrated single chip. The processor may take a form of one or more processors.

Hereinafter, a battery 500-equipped vehicle body according to an exemplary form of the present disclosure will described with reference to FIGS. 1 to 10.

The battery 500-equipped vehicle body has been developed to be mounted with the battery 500 on the lower portion of the vehicle body so as to be applied to an electric vehicle or a hybrid electric vehicle and to protect the battery 500.

Figure 1:
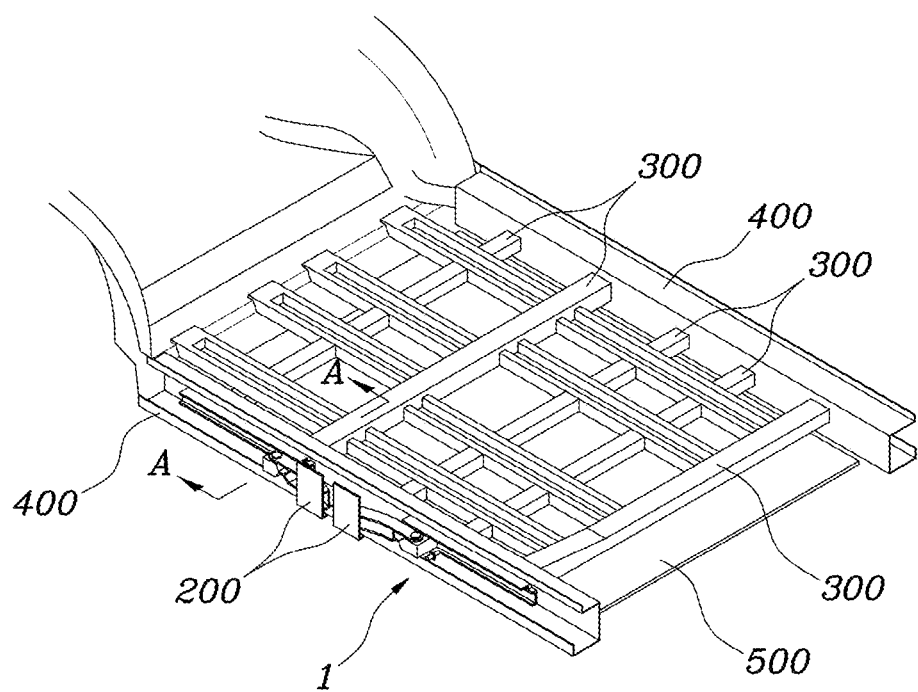
FIG. 1 is a perspective diagram illustrating a battery-equipped vehicle body according to an exemplary form of the present disclosure.
Figure 2:
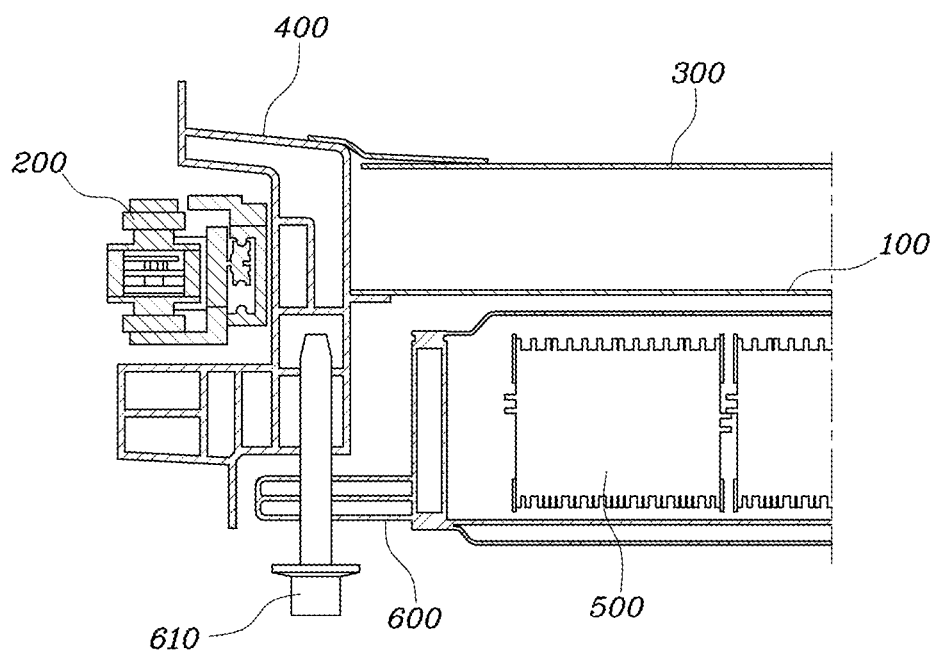
FIG. 2 is a cross-sectional diagram taken along the line A-A illustrated in FIG. 1.

FIG. 1 is a perspective diagram illustrating a battery-equipped vehicle body according to an exemplary form of the present disclosure, and FIG. 2 is a cross-sectional diagram taken along the line A-A illustrated in FIG. 1.

In one form, the battery 500-equipped vehicle body includes a lower panel 100 of a vehicle extending in the planar direction, and having the battery 500 coupled to the upper portion or lower portion thereof; a door opening/closing device 200 located on the side surface of the lower panel 100, and coupled so that a door 800 of the vehicle may be opened or closed; and a cross member 300 extending in a direction parallel to the transverse direction of the vehicle, coupled to the upper portion or lower portion of the lower panel 100, and located to correspond to the door opening/closing device 200 in the transverse direction.

As illustrated in FIGS. 1 and 2, the lower panel 100 may be made of a metallic material as a panel located under the vehicle, and manufactured by a press molding.

The battery 500 may be coupled to the lower surface of the lower panel 100, coupled by a bolting coupling, and also coupled in a coupling method other than the bolting coupling. The battery 500 may be connected to a motor for driving the vehicle to supply power to a motor driving of the vehicle.

The battery 500 may be composed of the battery 500 having various shapes, and a housing surrounding the battery 500 is formed to protect the battery 500 and thus the battery 500 may be coupled to the lower panel 100 together with the housing.

The door opening/closing device 200 is mounted on the side surface of the lower panel 100 and connected to the door 800 of the vehicle such that the door 800 of the vehicle may be opened and closed. The door opening/closing device 200 may be operated by the motor driving, and the motor may be connected to the battery 500 to receive power. Further, the door opening/closing device 200 may be connected to a control unit of the vehicle to be operated by a control of a driver of the vehicle.

The cross member 300 may be located on and coupled to the upper surface or lower surface of the lower panel 100, and coupled to a location transversely corresponding to the door opening/closing device 200.

Therefore, it is possible for the cross member 300 to support the side surface of the door opening/closing device 200, thereby inhibiting or preventing the battery 500 from being damaged or the battery 500 from being exploded by the shock transferred to the battery 500 due to the indentation of the door opening/closing device 200 in the transverse direction of the vehicle upon side collision of the vehicle.

The battery 500-equipped vehicle body further includes a side sill 400 extending in a direction parallel to the longitudinal direction of the vehicle, and coupled to both sides of the lower panel 100 or the cross member 300, and the door opening/closing device 200 is mounted on the outside of the side sill 400.

As illustrated in FIGS. 1 and 2, the side sill 400 may be coupled to the side surface of the lower panel 100. Therefore, it is possible to protect the side surfaces of the lower panel 100 and the battery 500 upon side collision of the vehicle.

Further, the door opening/closing device 200 of the vehicle may be mounted on one side of the side sill 400 to open and close the door 800 located on the side surface of the vehicle.

Further, a plurality of cross members 300 are coupled to the other side of the side sill 400 and coupled to both sides of the lower panel 100 to couple the side sills 400, and the cross member 300 may support the side sill 400, thereby improving the rigidity of the side sill 400.

Therefore, it is possible to protect the lower panel 100 and the battery 500 inside the side sill 400 upon side collision of the vehicle.

Figure 4:
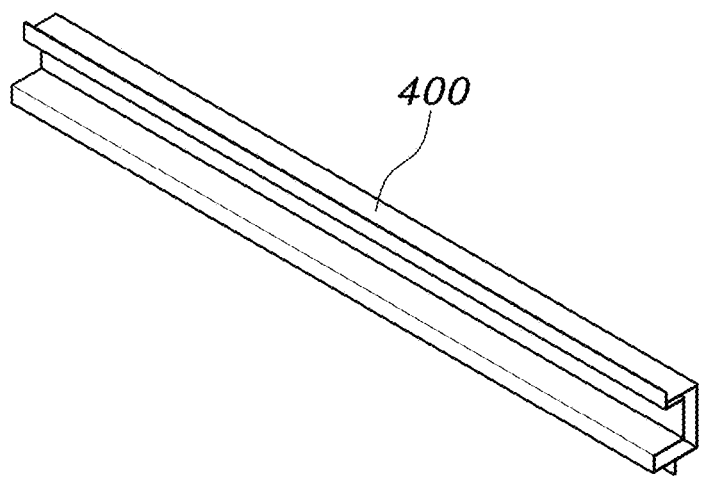
FIG. 4 is a perspective diagram illustrating a side sill of the battery-equipped vehicle body according to the exemplary foam of the present disclosure.

FIG. 4 is a perspective diagram illustrating the side sill 400 of the battery-equipped vehicle body according to the exemplary form of the present disclosure.

The side sill 400 is coupled to surround the upper portion or lower portion of the door opening/closing device 200.

As illustrated in FIGS. 1, 2, and 4, the door opening/closing device 200 may be mounted on the outside of the side sill 400, the top and bottom of the side sill 400 may extend outward, and surround the upper portion and lower portion of the door opening/closing device 200 mounted on the outer surface thereof, such that the door opening/closing device 200 and the side sill 400 may be coupled to each other.

Therefore, the side sill 400 may protect the door opening/closing device 200 from the external shock applied to the door opening/closing device 200 on the top or bottom thereof.

Figure 6:
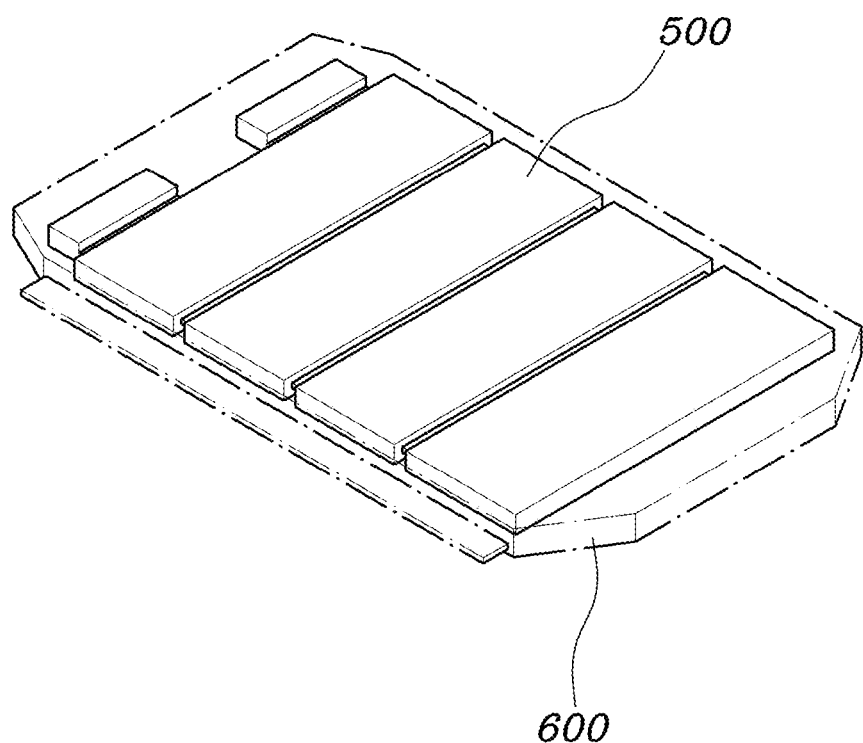
FIG. 6 is a perspective diagram illustrating a battery and a battery bracket of the battery-equipped vehicle body according to the exemplary form of the present disclosure.

FIG. 6 is a perspective diagram illustrating the battery 500 and a battery bracket 600 of the battery-equipped vehicle body according to the exemplary form of the present disclosure.

The battery-equipped vehicle body further includes the battery bracket 600 extending outward from the battery 500 in the transverse direction so as to be coupled to the side sill 400 in a state where the battery 500 and the side sill 400 are spaced apart from each other in the transverse direction.

As illustrated in FIGS. 2 and 6, the battery bracket 600 may couple the battery 500 to the side sill 400, and couple the battery 500 and the side sill 400 to be spaced apart from each other. The battery bracket 600 may separate the side sill 400 and the battery 500 from each other.

Therefore, it is possible to inhibit or prevent the battery 500 from being damaged by the indentation of the door opening/closing device 200 into the vehicle upon side collision of the vehicle.

The door opening/closing device 200 and the battery 500 are located so that parts thereof overlap with each other in the vertical direction of the vehicle.

As illustrated in FIG. 2, the door opening/closing device 200 coupled to the side sill 400 may be located so that the battery 500 and a predetermined portion in the vertical direction of the vehicle overlap with each other by the location of the battery bracket 600, and a portion not overlapping the battery 500 may be coupled to the cross member 300.

Therefore, the door opening/closing device 200 may divide the shock applied to the door opening/closing device 200 by the external shock into the cross member 300 side and the battery 500 side, thereby reducing the damage to the battery 500.

Figure 3:
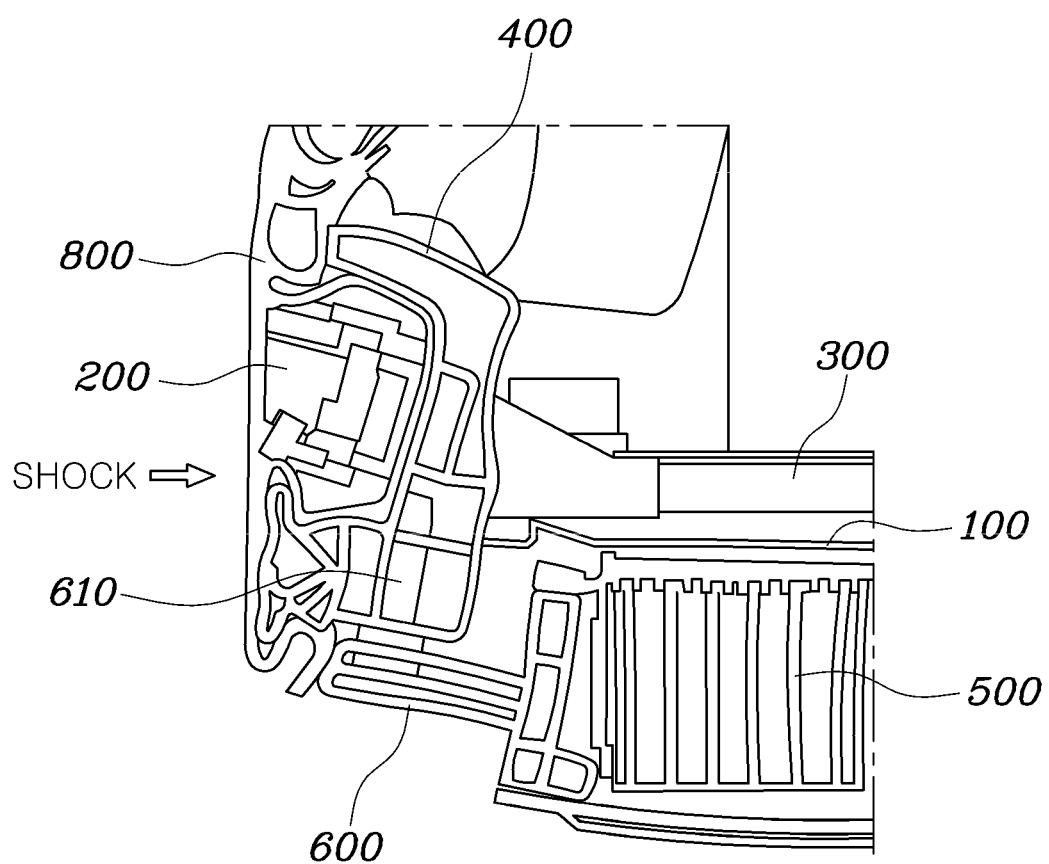
FIG. 3 is a cross-sectional diagram after side collision of a vehicle in FIG. 2.

FIG. 3 is a cross-sectional diagram after side collision of the vehicle in FIG. 2.

The battery bracket 600 and the side sill 400 are coupled to be penetrated from the bottom to the top by a mounting bolt 610.

As illustrated in FIGS. 2 and 3, the battery bracket 600 and the side sill 400 may be coupled to be penetrated from the bottom to the top.

As a result, when indented to the battery 500 side upon side collision, the door opening/closing device 200 is rotated around the portion in which the battery bracket 600 and the side sill 400 are coupled, and thus a shock force may be directed toward the cross member 300.

Therefore, it is possible to reduce or minimize the shock force transferred to the battery 500, thereby minimizing the damage to the battery 500.

Figure 7:
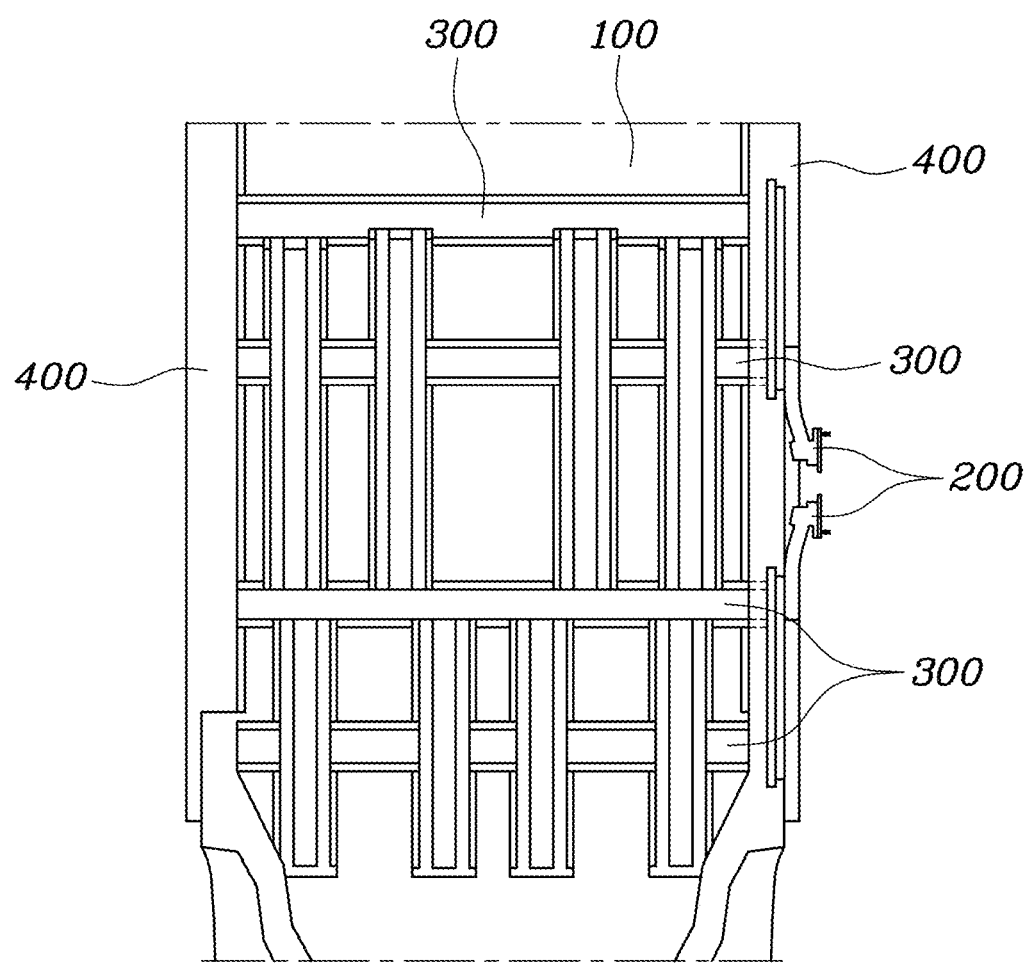
FIG. 7 is a plan diagram illustrating the battery-equipped vehicle body according to the exemplary form of the present disclosure.

FIG. 7 is a plan diagram illustrating the battery-equipped vehicle body according to the exemplary form of the present disclosure, and FIG. 8 is a bottom diagram illustrating the battery-equipped vehicle body according to the exemplary form of the present disclosure.

The cross member 300 is penetrated in the vertical direction of the vehicle together with the lower panel 100 and the high voltage battery 500 and coupled by the mounting module 700.

As illustrated in FIGS. 7 and 8, the battery 500 and the lower panel 100 may be vertically penetrated together with the cross member 300 and the battery 500, the lower panel 100, and the cross member 300 are coupled by the mounting module 700. The mounting module may be coupled by a bolting coupling, and also coupled in a method other than the bolting coupling.

As a result, it is possible to improve the coupling force between the battery 500, the lower panel 100, the battery 500, and the cross member 300, and to reduce noise from the road surface and vibration or noise generated by the lower panel 100, the battery 500, and the cross member 300.

Figure 5:
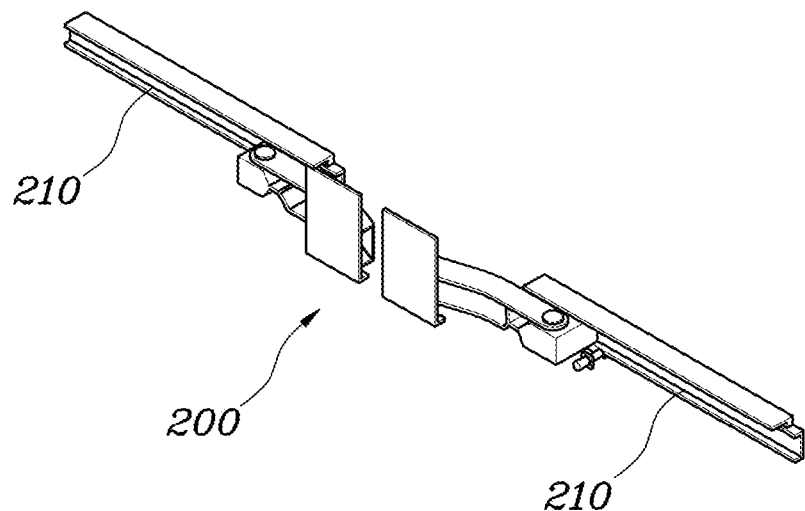
FIG. 5 is a perspective diagram illustrating a first exemplary form of a door opening/closing device in the battery-equipped vehicle body according to the exemplary form of the present disclosure.

FIG. 5 is a perspective diagram illustrating a first exemplary form of the door opening/closing device 200 in the battery-equipped vehicle body according to the exemplary form of the present disclosure.

The door opening/closing device 200 is provided with a sliding rail and opens and closes the door 800 of the vehicle by being slid in the longitudinal direction of the vehicle.

The sliding rail according to the first exemplary form of the present disclosure may be mounted on the side sill 400 and the door 800 of the vehicle may be opened along the sliding rail. The motor may be mounted on the sliding rail and connected to the door 800 to be operated so that the door 800 is opened and closed in a direction in which the sliding rail extends, and a side member may be located so that the location of the motor of the door opening/closing device 200 corresponds to the location when the door 800 is closed and thus may be coupled to the side sill 400.

A plurality of door opening/closing devices 200 are mounted as shown in FIG. 10, and the doors 800 are opposite to each other in the front-rear direction of the vehicle and slid and opened and closed.

The door opening/closing device 200 may have the plurality of doors 800 of the vehicle mounted thereon, the plurality of doors 800 facing each other and being opened to both sides thereof. A plurality of cross members 300 may be located at the locations at which the plurality of door opening/closing devices 200 are located, respectively, and coupled to the side sill 400.

As a result, even if a plurality of door opening/closing devices 200 are mounted, it is possible to support the door opening/closing device 200, thereby inhibiting or preventing the battery 500 from being damaged by the protrusion of the door opening/closing device 200 toward the battery 500 toward the battery 500 upon side collision of the vehicle.

FIG. 9 is a perspective diagram illustrating a second exemplary form of the door opening/closing device 200 in the battery 500-equipped vehicle body according to the exemplary form of the present disclosure.

The door opening/closing device 200 is provided with a swing hinge such that the door 800 of the vehicle is swung and opened and closed in the front or rear direction of the vehicle.

As illustrated in FIG. 9, the door opening/closing device 200 according to the second exemplary form of the present disclosure includes the swing hinge opened to the outside of the vehicle, such that the door 800 of the vehicle may be swung and opened in the front or rear direction of the vehicle around the axis of the swing hinge.

While the specific exemplary foam of the disclosure has been illustrated and described, it will be apparent to those skilled in the art that the present disclosure may be variously improved and changed without departing from the technical spirit of the present disclosure.

What is claimed is:

1. A battery-equipped vehicle body comprising:
    a lower panel extending in a planar direction, wherein a battery is coupled to an upper portion or a lower portion of the lower panel;
    a door opening/closing device located on a side surface of the lower panel, and coupled to a door of a vehicle so that the door of the vehicle is opened and closed; and
    a cross member extending in a transverse direction of the vehicle, coupled to the upper portion or the lower portion of the lower panel, and located to face the door opening/closing device in the transverse direction.

2. The battery-equipped vehicle body according to claim 1, further comprising: a side sill extending in a longitudinal direction of the vehicle, and coupled to both sides of the lower panel or the cross member,
    wherein the door opening/closing device is mounted on an outside of the side sill.

3. The battery-equipped vehicle body according to claim 2,
    wherein the side sill is coupled to surround an upper portion or a lower portion of the door opening/closing device.

4. The battery-equipped vehicle body according to claim 2, further comprising: a battery bracket extending outward from the battery in the transverse direction so as to be coupled to the side sill in a state where the battery and the side sill are spaced apart from each other in the transverse direction.

5. The battery-equipped vehicle body according to claim 1,
    wherein parts of the door opening/closing device overlap with parts of the battery in a vertical direction of the vehicle.

6. The battery-equipped vehicle body according to claim 2,
wherein a battery bracket and the side sill are penetrated from a bottom to a top and coupled by a mounting bolt.

7. The battery-equipped vehicle body according to claim 1,
wherein the lower panel and a high voltage battery penetrate the cross member in a vertical direction of the vehicle, and the lower panel and the high voltage battery are coupled by a mounting module.

8. The battery-equipped vehicle body according to claim 1,
wherein the door opening/closing device is provided with a sliding rail configured to guide the door to slide such that the door is opened and closed in a longitudinal direction of the vehicle.

9. The battery-equipped vehicle body according to claim 1, wherein the door opening/closing device is provided with a swing hinge and the door of the vehicle is swung and opened and closed in a front or rear direction of the vehicle.

* * * * *